Dec. 19, 1967 R. L. BOGGS 3,359,044
TRACTOR TRACK SHOE WITH REPLACEABLE WEAR PLATE
Filed Jan. 17, 1966 2 Sheets-Sheet 1

INVENTOR.
ROGER L. BOGGS
BY
Fryer, Gerswold, Fix & Phillips
ATTORNEYS

Dec. 19, 1967  R. L. BOGGS  3,359,044
TRACTOR TRACK SHOE WITH REPLACEABLE WEAR PLATE
Filed Jan. 17, 1966  2 Sheets-Sheet 2
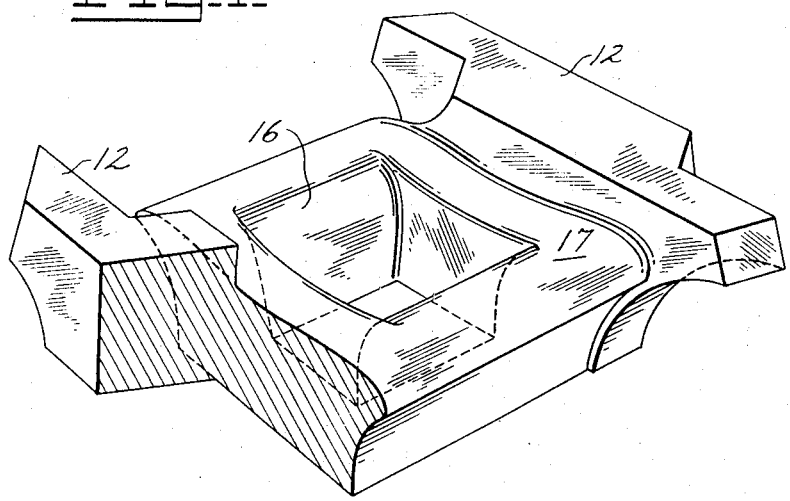
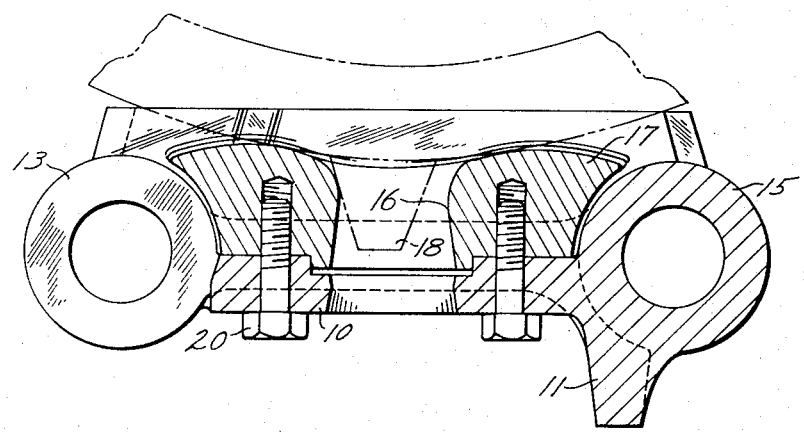
INVENTOR.
ROGER L. BOGGS
BY
Fryer, Genovold, Feix & Phillips
ATTORNEYS

United States Patent Office 3,359,044
Patented Dec. 19, 1967

3,359,044
TRACTOR TRACK SHOE WITH REPLACEABLE WEAR PLATE
Roger L. Boggs, East Peoria, Ill., assignor to Caterpillar Tractor Co., Peoria, Ill., a corporation of California
Filed Jan. 17, 1966, Ser. No. 521,050
2 Claims. (Cl. 305—57)

ABSTRACT OF THE DISCLOSURE

Track shoes for tractors or other vehicles operating on chain-type tracks and particularly a sprocket driven shoe with a replaceable portion which is subject to wear by engagement with the sprocket teeth.

---

Track chains are employed on many vehicles where they are trained about a series of track rollers, an idler and a driving sprocket and in one type of chain the sprocket teeth engage centrally of the track shoes which form the chain. The substantial force transmitted by the sprocket teeth through the shoes, the abrasive material inherently accumulating in the area, and peak loads from rapid acceleration and deceleration result in high wear of the drive surfaces of the shoes. This wear necessitates costly rebuilding of the entire track chain to maintain proper operating clearances.

It is the object of the present invention to provide a track shoe with a wear plate which includes an opening or aperture for engagement by sprocket teeth and to provide a wear plate which is readily removable as well as reversible.

Another object of the invention is to provide a wear plate secured in place as by cap screws but in which shearing forces are isolated from the cap screws because of the manner in which the plate is received in the track shoe.

A further object of the invention is the provision of a track shoe with a removable wear plate as described above and in which track areas which are also subjected to rapid wear under the action of track rollers thereon, are formed integrally with, and are therefore also removable with the wear plate.

Further objects and advantages and the manner in which the invention is carried into practice are made apparent in the following specification wherein the invention is described in detail by reference to the accompanying drawings.

In the drawings:

FIG. 4 is a view like FIG. 2 with parts in section and illustrating a modified form of the present invention; and FIG. 5 is a view like FIG. 3 also illustrating the modification shown in FIG. 4.

Figure 1:
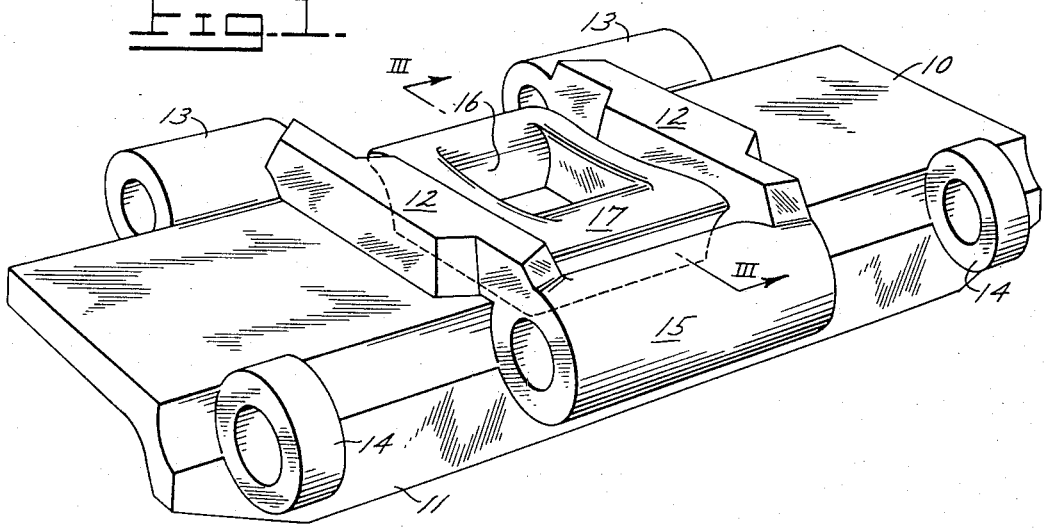
FIG. 1 is a perspective view of a track shoe with a removable wear plate embodying the present invention.
Figure 2:
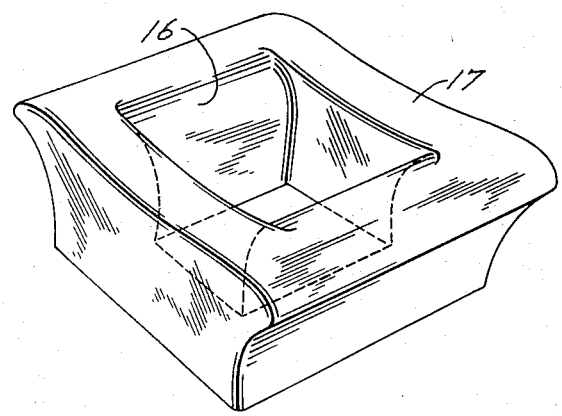
FIG. 2 is an enlarged view of the wear plate shown in FIG. 1.

A typical track shoe is shown in FIG. 1 as having a body 10, a grouser 11, track areas 12 and track pin bearing members 13 at one edge and 14 and 15 at the opposite edge. The track pin bearing elements at each edge complement the elements at the opposite edge of an adjacent shoe in receiving the usual track pin or hinge pin. When the shoes are made up into an endless chain on a vehicle, the teeth on the vertical drive sprocket engage centrally disposed apertures such as shown at 16 in the shoes.

Figure 3:
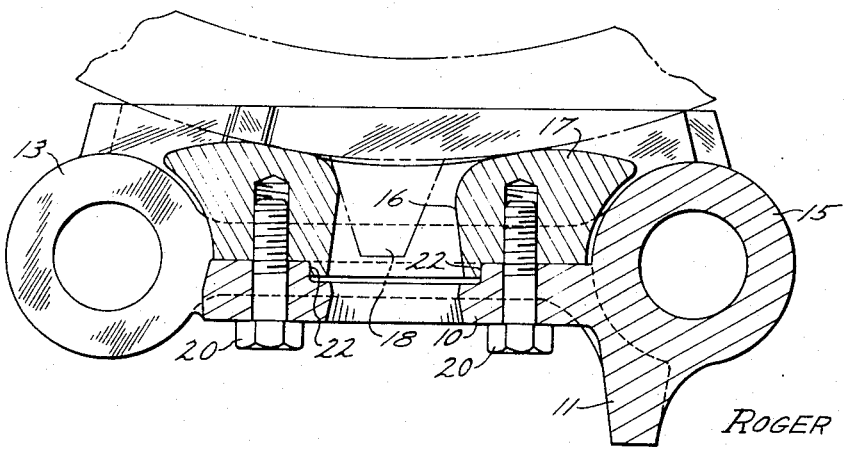
FIG. 3 is a sectional view taken on the line III—III of FIG. 1.

In accordance with the present invention these apertures 16 are disposed in a replaceable element shown at 17. A portion of a sprocket is shown in broken lines in FIG. 3 as having a tooth 18 engaged in the aperture 16. The replaceable member 17 is secured in place by four cap screws, two of which are shown in FIG. 3 at 20. The wear plate is bisymmetric in configuration and the arrangement of the holes for the cap screws is also bisymmetric so that it is possible to reverse the position of the wear plate so that machines which are operated predominantly in a forward direction and produce greater wear on one edge of the aperture can have their wear plates reversed to extend their useful life. The wear plates are also readily removable and replaceable to extend the useful life of the entire shoe.

Another advantage of the construction illustrated is that the wear plates fit snugly within the socket of the shoe which receives them so that thrust in a direction parallel to the surface of the ground occasioned upon driving and stopping is absorbed by the abutting areas shown at 22 in FIG. 3 to prevent a thrust reaction which tends to shear the cap screws 20.

A modified form of the invention is illustrated in FIGS. 4 and 5 wherein the track areas 12 are illustrated as formed integrally with the replaceable member 17. These track areas correspond to the track links of conventional track-type tractor tracks and provide the rail surfaces upon which the track rollers travel sustaining the greater portion of the weight of the tractor. These surfaces are therefore also subject to rapid wear, and, being formed as shown in FIGS. 4 and 5, will be replaceable with the tooth socket with little if any extra labor. Furthermore, the track areas can be designed for snug engagement with the bearing members 13 and 15 between which they lie to absorb thrust in the manner of the shoulders 22 of FIG. 3. With this construction, the shoulders 22 may be eliminated if desired.

I claim:

1. A track shoe of generally rectangular configuration having pivot means on two edges and having two spaced upstanding rail surface parts arranged centrally thereof, a rectangular recess between said parts, and a rectangular replaceable perforate member fitting within said recess and providing a wear surface for a sprocket tooth which imparts driving motion to said track shoe, and means securing said member in place within the recess.

2. The combination of claim 1 in which the two spaced rail surfaces and the perforate member are formed integrally with each other and are received as a unit in the recess in the track shoe.

References Cited
UNITED STATES PATENTS

| | | | |
|---|---|---|---|
| 1,733,526 | 10/1926 | Coburn | 305—57 |
| 1,764,520 | 6/1930 | Moore | 305—57 |
| 1,835,627 | 12/1931 | Bauer | 305—57 |
| 3,053,579 | 9/1962 | Trudeau | 305—57 |
| 3,120,409 | 2/1964 | Beall | 305—57 |

RICHARD J. JOHNSON, *Primary Examiner.*
BENJAMIN HERSH, *Examiner.*